United States Patent
DiBurro et al.

(10) Patent No.: US 9,338,066 B2
(45) Date of Patent: May 10, 2016

(54) TUNNEL KEEP-ALIVE TIMEOUT MECHANISM BASED ON QUALITY OF SERVICE (QOS) VALUE OF RECEIVED KEEP-ALIVE MESSAGES

(71) Applicant: Avaya Inc., Basking Ridge, NJ (US)

(72) Inventors: Lawrence DiBurro, Haverhill, MA (US); Prasad Vadassery, Bangalore (IN)

(73) Assignee: Avaya Inc., Basking Ridge, NJ (US)

( * ) Notice: Subject to any disclaimer, the term of this patent is extended or adjusted under 35 U.S.C. 154(b) by 116 days.

(21) Appl. No.: 14/018,609

(22) Filed: Sep. 5, 2013

(65) Prior Publication Data

US 2015/0063117 A1    Mar. 5, 2015

(51) Int. Cl.
*H04L 12/26* (2006.01)
*H04L 12/24* (2006.01)

(52) U.S. Cl.
CPC .......... *H04L 41/5025* (2013.01); *H04L 43/103* (2013.01)

(58) Field of Classification Search
None
See application file for complete search history.

(56) References Cited

U.S. PATENT DOCUMENTS

| | | | |
|---|---|---|---|
| 6,680,934 B1 * | 1/2004 | Cain | H04L 12/24 370/352 |
| 2003/0188035 A1 * | 10/2003 | Lubbers et al. | 709/310 |
| 2007/0058526 A1 * | 3/2007 | Jain | H04L 12/462 370/216 |
| 2008/0120177 A1 * | 5/2008 | Moscirella | G06F 11/2023 705/14.12 |
| 2010/0228863 A1 * | 9/2010 | Kawauchi | H04W 76/045 709/227 |
| 2011/0103399 A1 * | 5/2011 | Bransi et al. | 370/470 |
| 2012/0110173 A1 * | 5/2012 | Luna | H04L 69/28 709/224 |
| 2012/0331087 A1 * | 12/2012 | Luna | H04L 67/145 709/213 |
| 2014/0003352 A1 * | 1/2014 | Dai | H04L 41/0836 370/328 |
| 2014/0068041 A1 * | 3/2014 | Obligacion | 709/223 |
| 2015/0009990 A1 * | 1/2015 | Sung et al. | 370/392 |
| 2015/0063364 A1 * | 3/2015 | Thakkar | H04L 12/66 370/401 |
| 2015/0138956 A1 * | 5/2015 | Hathorn | H04L 41/0668 370/227 |

* cited by examiner

*Primary Examiner* — Otis L Thompson, Jr.

(57) ABSTRACT

A method, apparatus and computer program product for providing a variable tunnel keep-alive interval is presented. A tunnel keep-alive packet for a first tunnel is received at a first switching device. A Quality of Service (QoS) value of the keep-alive packet ishcekce. A determination is made regarding whether the QoS value corresponds to a QoS value of network control traffic, and when the QoS value of the keep-alive packet is lower than the QoS value of the network control traffic then a value of a tunnel keep-alive interval is increased.

20 Claims, 4 Drawing Sheets

TUNNEL KEEP-ALIVE TIMEOUT MECHANISM BASED ON QUALITY OF SERVICE (QOS) VALUE OF RECEIVED KEEP-ALIVE MESSAGES

BACKGROUND

In the field of computer networking and other packet-switched telecommunication networks, the term Quality of Service (QoS) is the ability to provide different priority to different applications, users, or data flows, or to guarantee a certain level of performance to a data flow. For example, a required bit rate, delay, jitter, packet dropping probability and/or bit error rate may be guaranteed. QoS guarantees are important if the network capacity is insufficient, especially for real-time streaming multimedia applications such as voice over IP, online games and IP-TV, since these often require fixed bit rate and are delay sensitive, and in networks where the capacity is a limited resource, for example in cellular data communication.

A network or protocol that supports QoS may agree on a traffic contract with the application software and reserve capacity in the network nodes, for example during a session establishment phase. During the session it may monitor the achieved level of performance, for example the data rate and delay, and dynamically control scheduling priorities in the network nodes. It may release the reserved capacity during a tear down phase.

The Wireless Local Area Network (LAN) split-plane architecture involves creation of tunnels between pairs of switches or between Access Points (APs) and switches. Certain types of tunnels may utilize a "keep-alive" (also referred to herein as a "heartbeat") mechanism that monitors tunnel reachability and availability. Keep-alive messages are sent and received between the Wireless Access Point and Wireless switching station, where the tunnel terminates. This ensures that the tunnel is alive and active. Keep-alive packets are sent at fixed intervals. If the tunnel end station does not receive the Keep-alive control packet in a fixed time period, it proceeds to bring down the tunnel in order to free bandwidth that would otherwise be wasted.

SUMMARY

Conventional mechanisms such as those explained above suffer from a variety of deficiencies. One such deficiency is that in any wireless LAN network, the keep-alive packets need to be treated with the highest priority QOS ensuring that the keep-alive packets get the proper network traffic treatment during the transmit path. If a network administrator makes any intermediate aggregation nodes from the access point as un-trusted, it will bring down the QOS priority of the keep-alive packet. This will prevent keep-alive packets from being treated at par with network control traffic, which could cause loss of keep-alive packets in congested networks and eventual tunnel tear down.

Embodiments of the invention significantly overcome such deficiencies and provide mechanisms and techniques that provide a variable tunnel keep-alive interval. Different keep alive re-tries are used to tear down tunnels based on the Quality of Service given to the incoming keep-alive packets. Current implementations use a fixed keep-alive interval. Different keep-alive retry values are used for different tunnels depending on the QoS value of the keep-alive packet.

In a particular embodiment of a method for providing a variable tunnel keep-alive interval the method includes receiving a tunnel keep-alive packet for a first tunnel at a first switching device. The method further includes checking a Quality of Service (QoS) value of the keep-alive packet. Further, the method involves determining if the QoS value corresponds to a QoS value of network control traffic, and when the QoS value of the keep-alive packet is lower than the QoS value of the network control traffic then increasing a value of a tunnel keep-alive interval.

Other embodiments include a computer readable medium having computer readable code thereon for providing a variable tunnel keep-alive interval. The computer readable medium includes instructions for receiving a tunnel keep-alive packet for a first tunnel at a first switching device. The computer readable medium further includes instructions for checking a Quality of Service (QoS) value of the keep-alive packet. Further, the computer readable medium includes instructions for determining if the QoS value corresponds to a QoS value of network control traffic, and when the QoS value of the keep-alive packet is lower than the QoS value of the network control traffic then increasing a value of a tunnel keep-alive interval.

Still other embodiments include a computerized device (e.g., a network switching device), configured to process all the method operations disclosed herein as embodiments of the invention. In such embodiments, the computerized device includes a memory system, a processor, communications interface in an interconnection mechanism connecting these components. The memory system is encoded with a process that provides a variable tunnel keep-alive interval as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a variable tunnel keep-alive interval as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
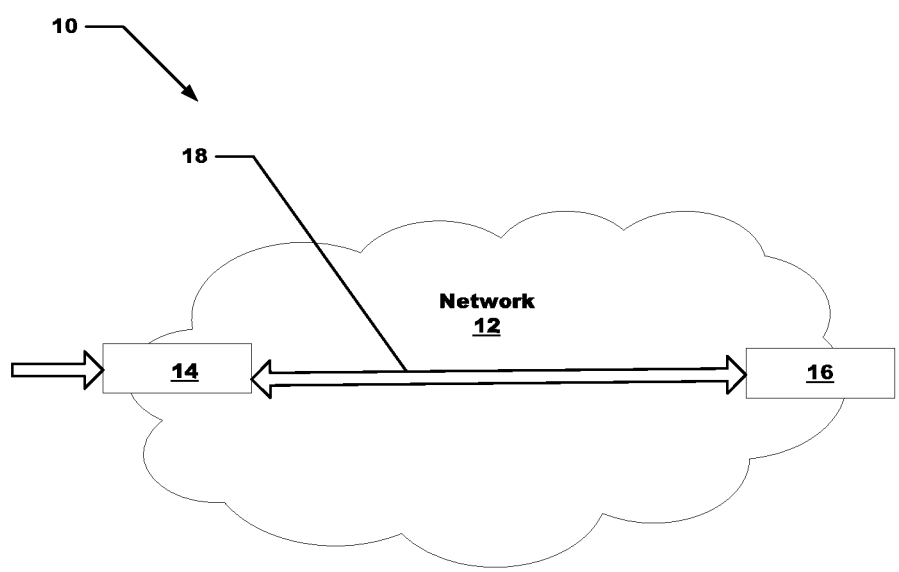
FIG. 1 shows a network diagram of a system providing a variable tunnel keep-alive interval in accordance with embodiments of the present invention.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

Referring to FIG. 1, a network environment 10 is shown. Network environment shows a network 12 having an Access Point (AP) 14, a first switching device 16 (also referred to as an end station) and a tunnel 18 extending between the AP 14 and the end station 16. Network 12 is only shown having two devices for reasons of explanation, though it should be appreciated that several devices are typically part of a network. Similarly, while only a single tunnel is shown, there can be a large number of tunnels within network 12.

In order to maintain the tunnel 18 and not tie up valuable network bandwidth unnecessarily if the tunnel should become inactive, a keep-alive mechanism is employed. Keep-alive messages are sent and received between the Wireless Access Point 14 and the end station 16, where the tunnel 18 terminates. This ensures that the tunnel 18 is alive and active. The keep-alive packets are sent at fixed intervals. If the tunnel end station 16 does not receive the keep-alive control packet in a fixed time period, it proceeds to bring down the tunnel 18 since a distinction has been made that the tunnel is inactive and wasting network bandwidth.

By way of the present invention, the conventional fixed interval keep-alive mechanism is modified to a variable interval keep-alive mechanism based on the QOS value of the incoming keep-alive packet. When a keep-alive packet reaches the end station 16, the respective tunnel tables are updated and the time interval verified. The tunnel keep-alive mechanism constantly polls the tunnel table to ensure if it has received at least one tunnel keep-alive packet in a fixed time window. It is always expected that the network gives keep-alive packet the same treatment it gives to network control traffic.

When the keep-alive packet is received by the end station 16, it checks the QOS value of the incoming keep-alive packet. If the value does not correspond to the network control traffic QOS, the system assumes that the intermediate switches have lowered the QOS priority. The tunnel keep-alive interval is then automatically increased to a higher value to accommodate the changed QOS. This will allow larger QOS retries before the tunnel is brought down and diminish cases where the tunnel would be torn down unnecessarily.

Figure 2:
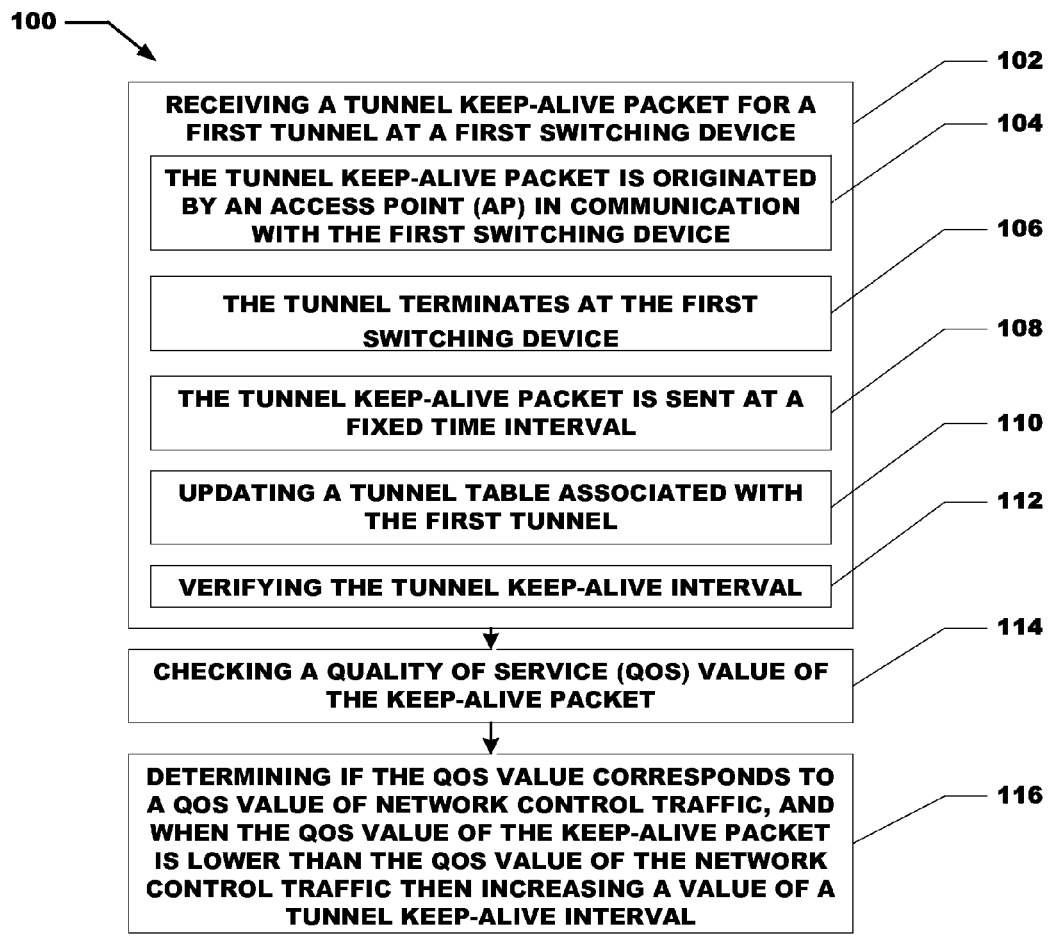
FIG. 2 comprises a flow diagram of a first part of a particular embodiment of a method for providing a variable tunnel keep-alive interval in accordance with the present invention.

A flow chart of a particular embodiment of the presently disclosed method is depicted in FIG. 2. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the decision and processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 3:
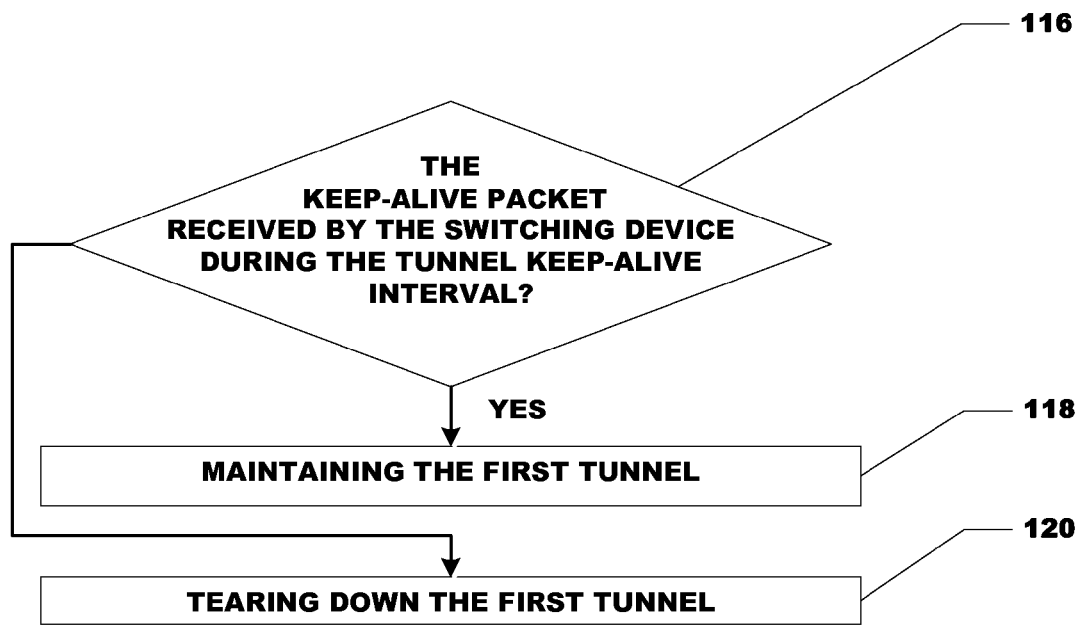
FIG. 3 comprises a flow diagram of a second part of a particular embodiment of a method for providing a variable tunnel keep-alive interval in accordance with the present invention.

Referring to FIG. 3, a flow diagram of a first part of a particular method 100 for providing a variable tunnel keep-alive interval is shown. Method 100 begins with processing block 102 which discloses receiving a tunnel keep-alive packet for a first tunnel at a first switching device. This is done at regular predefined intervals to ensure that the tunnel is active to prevent wasted bandwidth should the tunnel have become inactive for some reason. As shown in processing block 104, the tunnel keep-alive packet is originated by an Access Point (AP) in communication with the first switching device. As shown in processing block 106 the tunnel terminates at the first switching device. The tunnel extends from the AP to the first switching device across the network. As shown in processing block 108, the tunnel keep-alive packet is sent at a fixed time interval. This insures that the viability of the tunnel is constantly monitored so as not to waste bandwidth on inactive tunnels. Processing block 110 states updating a tunnel table associated with the first tunnel. This done to modify the variable tunnel keep-alive interval. Processing block 112 recites verifying the tunnel keep-alive interval.

Processing continues with processing block 114 which discloses checking a Quality of Service (QoS) value of the keep-alive packet. If a network administrator makes any of the intermediate aggregation nodes from the access point as un-trusted, it will bring down the QOS priority of the keep-alive packet. This will prevent keep-alive packets from being treated at par with network control traffic, which could cause loss of keep-alive packets in congested networks and eventual unnecessary tunnel tear down.

Referring now to FIG. 3, a second part of a particular embodiment of a method for providing a variable tunnel keep-alive interval is shown. The first part shown in FIG. 2 may be executed multiple times before the part shown in FIG. 3 is executed. Processing block 116 states determining if the QoS value corresponds to a QoS value of network control traffic, and when the QoS value of the keep-alive packet is lower than the QoS value of the network control traffic then increasing a value of a tunnel keep-alive interval. This allows larger QoS retries before the tunnel is brought down while still providing the ability to not tie up valuable network bandwidth unnecessarily if the tunnel should become inactive.

Processing continues with decision block 118 wherein a determination is made regarding whether the keep-alive packet is received by the switching device during the tunnel keep-alive interval. As shown in processing block 120, when the keep-alive packet is received by the switching device during the tunnel keep-alive interval, the tunnel is maintained. On the other hand, as shown in processing block 122, when the keep-alive packet is not received by the switching device during the tunnel keep-alive interval, the tunnel is torn down so as not tie up valuable network bandwidth unnecessarily when the tunnel becomes inactive.

Figure 4:
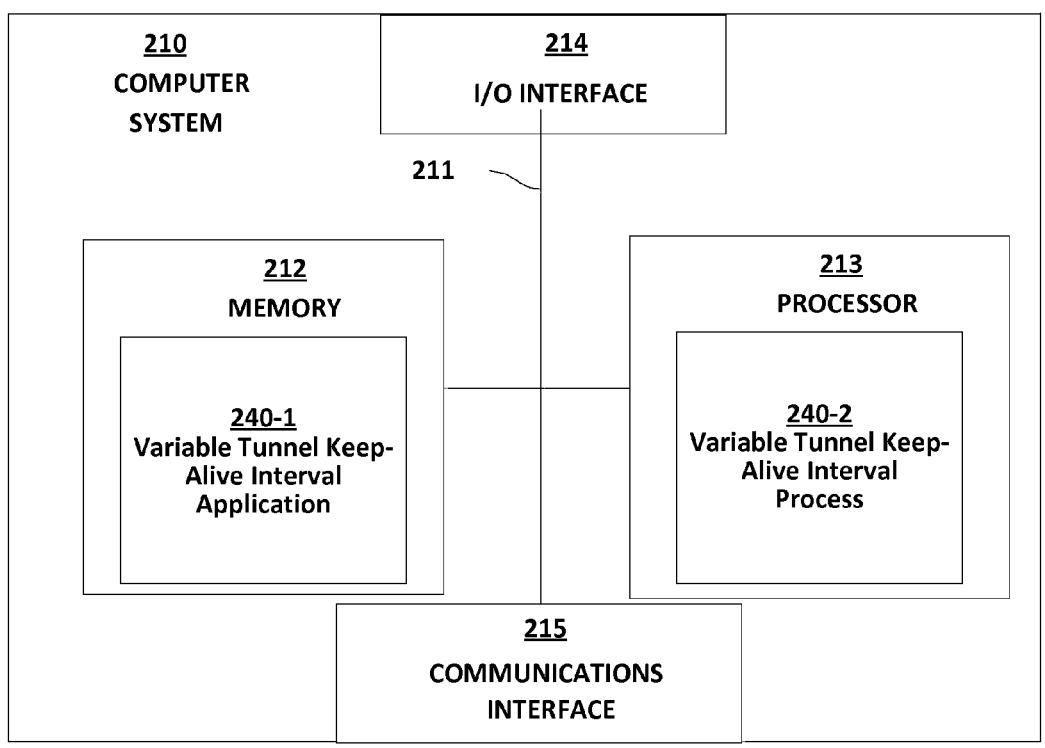
FIG. 4 illustrates an example computer system architecture for a computer system that a provides a variable tunnel keep-alive interval in accordance with embodiments of the invention.

FIG. 4 is a block diagram illustrating example architecture of a computer system 210 that executes, runs, interprets, operates or otherwise performs a variable tunnel keep-alive application 240-1 and variable tunnel keep-alive process 240-2 suitable for use in explaining example configurations disclosed herein. The computer system 210 may be any type of computerized device such as a network switching device or the like. An input device 216 (e.g., one or more customer/developer controlled devices such as a keyboard, mouse, etc.) couples to processor 213 through I/O interface 214, and enables a customer 208 to provide input commands, and generally control the graphical customer interface 260 that the variable tunnel keep-alive application 240-1 and process 240-2 provides on the display 230. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with a variable tunnel keep-alive application 240-1 as explained herein. The variable tunnel keep-alive application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of a variable tunnel keep-alive application 240-1. Execution of a variable tunnel keep-alive application 240-1 in this manner produces processing functionality in the variable tunnel keep-alive process 240-2. In other words, the variable tunnel keep-alive process 240-2 represents one or more portions or runtime instances of a variable tunnel keep-alive application 240-1 (or the entire a variable tunnel keep-alive application 240-1) performing or executing within or upon the processor 213 in the computerized device 210 at runtime.

It is noted that example configurations disclosed herein include the variable tunnel keep-alive application 240-1 itself (i.e., in the form of un-executed or non-performing logic instructions and/or data). The variable tunnel keep-alive application 240-1 may be stored on a computer readable medium (such as a floppy disk), hard disk, electronic, magnetic, optical, or other computer readable medium. A variable tunnel keep-alive application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a variable tunnel keep-alive application 240-1 in the processor 213 as the variable tunnel keep-alive process 240-2. Those skilled in the art will understand that the computer system 210 may include other processes and/or software and hardware components, such as an operating system not shown in this example.

During operation, processor 213 of computer system 200 accesses memory system 212 via the interconnect 211 in order to launch, run, execute, interpret or otherwise perform the logic instructions of the persistent security application 240-1. Execution of persistent security application 240-1 produces processing functionality in persistent security process 240-2. In other words, the persistent security process 240-2 represents one or more portions of the persistent security application 240-1 (or the entire application) performing within or upon the processor 213 in the computer system 200.

It should be noted that, in addition to the persistent security process 240-2, embodiments herein include the persistent security application 240-1 itself (i.e., the un-executed or non-performing logic instructions and/or data). The persistent security application 240-1 can be stored on a computer readable medium such as a floppy disk, hard disk, or optical medium. The persistent security application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of persistent security application 240-1 in processor 213 as the persistent security process 240-2. Those skilled in the art will understand that the computer system 200 can include other processes and/or software and hardware components, such as an operating system that controls allocation and use of hardware resources associated with the computer system 200. The devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:
   receiving a tunnel keep-alive packet for a first tunnel at a first switching device;
   checking a Quality of Service (QoS) value of said keep-alive packet said QoS value of said keep-alive packet representing a priority level of said keep-alive packet; and
   determining if said QoS value corresponds to a QoS value of network control traffic, said QoS value of said network control traffic representing a priority level of said network control traffic, and when the QoS value of said keep-alive packet is lower than said QoS value of said network control traffic then increasing a value of a tunnel keep-alive interval.

2. The method of claim 1 wherein said tunnel keep-alive packet is originated by an Access Point (AP) in communication with said first switching device.

3. The method of claim 1 wherein said tunnel terminates at said first switching device.

4. The method of claim 1 wherein said tunnel keep-alive packet is sent at a fixed time interval.

5. The method of claim 1 further comprising maintaining said first tunnel when said keep-alive packet is received by said switching device during said tunnel keep-alive interval.

6. The method of claim 1 further comprising tearing down said first tunnel when said keep-alive packet is not received by said switching device during said tunnel keep-alive interval.

7. The method of claim 1 wherein said receiving a tunnel keep-alive packet for a first tunnel at a first switching device further comprises updating a tunnel table associated with said first tunnel.

8. The method of claim 7 further comprising verifying said tunnel keep-alive interval.

9. A non-transitory computer readable storage medium having computer readable code thereon for providing a variable tunnel keep-alive interval, the medium including instructions in which a computer system performs operations comprising:
   receiving a tunnel keep-alive packet for a first tunnel at a first switching device;
   checking a Quality of Service (QoS) value of said keep-alive packet, said QoS value of keep-alive packet representing a priority level of said keep-alive packet; and determining if said QoS value corresponds to a QoS value of network control traffic said QoS value of said network control traffic representing a priority level of said network control traffic, and when the QoS value of said keep-alive packet is lower than said QoS value of said network control traffic then increasing a value of a tunnel keep-alive interval.

10. The computer readable storage medium of claim 9 further comprising instructions wherein said tunnel keep-alive packet is originated by an Access Point (AP) in communication with said first switching device.

11. The computer readable storage medium of claim 9 further comprising instructions wherein said tunnel terminates at said first switching device.

12. The computer readable storage medium of claim 9 further comprising instructions wherein said tunnel keep-alive packet is sent at a fixed time interval.

13. The computer readable storage medium of claim 9 further comprising instructions for maintaining said first tunnel when said keep-alive packet is received by said switching device during said tunnel keep-alive interval and instructions for tearing down said first tunnel when said keep-alive packet is not received by said switching device during said tunnel keep-alive interval.

14. The computer readable storage medium of claim 9 further comprising instructions wherein said receiving a tunnel keep-alive packet for a first tunnel at a first switching device further comprises updating a tunnel table associated with said first tunnel and verifying said tunnel keep-alive interval.

15. A network switching device comprising:
a memory;
a processor;
a communications interface;
an interconnection mechanism coupling the memory, the processor and the communications interface; and
wherein the memory is encoded with an application providing a variable tunnel keep-alive interval, that when performed on the processor, provides a process for processing information, the process causing the computer system to perform the operations of:
receiving a tunnel keep-alive packet for a first tunnel at a first switching device;
checking a Quality of Service (QoS) value of said keep-alive packet, said QoS value of said keep-alive packet representing a priority level of said keep-alive packet; and
determining if said QoS value corresponds to a QoS value of network control traffic, said QoS value of said network control traffic representing a priority level of said network control traffic and when the QoS value of said keep-alive packet is lower than said QoS value of said network control traffic then increasing a value of a tunnel keep-alive interval.

16. The network switching device of claim 15 wherein said tunnel keep-alive packet is originated by an Access Point (AP) in communication with said first switching device.

17. The network switching device of claim 15 wherein said tunnel terminates at said first switching device.

18. The network switching device of claim 15 wherein said tunnel keep-alive packet is sent at a fixed time interval.

19. The network switching device of claim 15 further comprising maintaining said first tunnel when said keep-alive packet is received by said switching device during said tunnel keep-alive interval and tearing down said first tunnel when said keep-alive packet is not received by said switching device during said tunnel keep-alive interval.

20. The network switching device of claim 15 wherein said receiving a tunnel keep-alive packet for a first tunnel at a first switching device further comprises updating a tunnel table associated with said first tunnel and verifying said tunnel keep-alive interval.

* * * * *